(12) United States Patent
Labadie et al.

(10) Patent No.: US 11,868,407 B2
(45) Date of Patent: Jan. 9, 2024

(54) MULTI-LEVEL DATA STRUCTURE COMPARISON USING COMMUTATIVE DIGESTING FOR UNORDERED DATA COLLECTIONS

(71) Applicant: Dell Products L.P., Round Rock, TX (US)

(72) Inventors: Derek Labadie, Deux-Montagnes (CA); Dominique Prunier, Montreal (CA)

(73) Assignee: Dell Products L.P., Round Rock, TX (US)

( * ) Notice: Subject to any disclaimer, the term of this patent is extended or adjusted under 35 U.S.C. 154(b) by 268 days.

(21) Appl. No.: 17/030,500

(22) Filed: Sep. 24, 2020

(65) Prior Publication Data
US 2022/0092113 A1 Mar. 24, 2022

(51) Int. Cl.
*G06F 16/90* (2019.01)
*G06F 16/906* (2019.01)
*G06F 16/903* (2019.01)
*G06F 16/901* (2019.01)
*G06F 7/02* (2006.01)

(52) U.S. Cl.
CPC ............ *G06F 16/906* (2019.01); *G06F 7/02* (2013.01); *G06F 16/9027* (2019.01); *G06F 16/90335* (2019.01)

(58) Field of Classification Search
CPC ............ G06F 16/906; G06F 16/90335; G06F 16/9027
See application file for complete search history.

(56) References Cited

U.S. PATENT DOCUMENTS 6,735,595 B2 * 5/2004 Gobeille ............ G06F 16/9027
707/999.102
8,200,775 B2 * 6/2012 Moore ................... H04L 63/20
709/217

(Continued)

FOREIGN PATENT DOCUMENTS

EP 4042632 * 8/2022

OTHER PUBLICATIONS

Hu et al, Taichi: a language for high-performance computation on spatially sparse data structures. ACM 2019.*

*Primary Examiner* — Daniel A Kuddus
(74) *Attorney, Agent, or Firm* — Ryan, Mason & Lewis, LLP

(57) ABSTRACT

Techniques are provided for comparing multi-level data structures using commutative digesting for unordered data collections. One method comprises obtaining two multi-level data structures, wherein at least one multi-level data structure comprises an unordered data collection; determining a data structure digest value for each the two multi-level data structures by accumulating a data element digest value for each data element of the respective multi-level data structure, wherein a data element digest value for a given data element comprising an unordered data collection is determined using a commutative accumulator function; and evaluating a similarity of the two multi-level data structures by comparing the respective data structure digest values. A data element digest value for a given data element comprising an ordered data collection can be determined using a noncommutative accumulator function that aggregates a digest value for each data element using a noncommutative operation.

20 Claims, 15 Drawing Sheets

(56) References Cited

U.S. PATENT DOCUMENTS

| | | | | |
|---|---|---|---|---|
| 8,463,787 | B2* | 6/2013 | Kirshenbaum | G06F 16/137 |
| | | | | 707/737 |
| 9,158,472 | B2* | 10/2015 | Kesselman | G06F 16/2291 |
| 9,396,202 | B1* | 7/2016 | Drobychev | G06F 16/178 |
| 9,419,852 | B1* | 8/2016 | Heller | H04L 9/40 |
| 9,600,558 | B2* | 3/2017 | Kesselman | G06F 3/0605 |
| 9,977,600 | B1* | 5/2018 | Sanvido | G06F 3/0641 |
| 10,649,676 | B1* | 5/2020 | De Smet | G06F 3/0608 |
| 2002/0107860 | A1* | 8/2002 | Gobeille | G06F 16/9027 |
| 2006/0235831 | A1* | 10/2006 | Adinolfi | G06Q 40/00 |
| 2009/0037456 | A1* | 2/2009 | Kirshenbaum | G06F 16/137 |
| | | | | 707/999.102 |
| 2010/0306192 | A1* | 12/2010 | Kapur | G06F 16/9535 |
| | | | | 707/723 |
| 2012/0011569 | A1* | 1/2012 | Chou | H04W 12/106 |
| | | | | 726/4 |
| 2012/0124282 | A1* | 5/2012 | Frank | G06F 3/067 |
| | | | | 711/216 |
| 2016/0026667 | A1* | 1/2016 | Mukherjee | G06F 3/0679 |
| | | | | 707/714 |
| 2018/0300330 | A1* | 10/2018 | Samwel | G06F 16/2456 |
| 2019/0213322 | A1* | 7/2019 | Dehon | G06F 9/4401 |

* cited by examiner

FIG. 2A

| NAME 212 | SYSTEMS 214 | OBJECTIVES 216 |
|---|---|---|
| ALICE | - ALPHA<br>- ARROW | 1. ANALYZING<br>2. MONITORING |
| BOB | - BRAIN<br>- BLINK | 1. UPGRADING<br>2. TRAINING |

200

FIG. 2B 210-1
- NAME (2): ALICE (3)
SYSTEMS (5):
- ALPHA (7)
- ARROW (11)
OBJECTIVES (13):
- ANALYSING (17)
- MONITORING (19)
- NAME (2): BOB (23)
SYSTEMS (5):
- BRAIN (29)
- BLINK (31)
OBJECTIVES (13):
- UPGRADING (37)
- TRAINING (41)

210-2
- NAME (2): BOB (23)
OBJECTIVES (13):
- UPGRADING (37)
- TRAINING (41)
SYSTEMS (5):
- BLINK (29)
- BRAIN (31)
- NAME (2): ALICE (3)
SYSTEMS (5):
- ARROW (11)
- ALPHA (7)
OBJECTIVES (13):
- ANALYSING (17)
- MONITORING (19)

```
[
  {
    "NAME": "ALICE",
    "SYSTEMS": [
      "ALPHA",
      "ARROW"
    ],
    "OBJECTIVES": [
      "ANALYZING",
      "MONITORING"
    ]
  },
  {
    "NAME": "BOB",
    "SYSTEMS": [
      "BRAIN",
      "BLINK"
    ],
    "OBJECTIVES": [
      "UPGRADING",
      "TRAINING"
    ]
  }
]
```

- COMPUTE PATH
- IF ELEMENT TYPE IS A COLLECTION:
  - IF ELEMENT PATH RESOLVES TO UNORDERED COLLECTION
    - INITIALIZE A COMMUTATIVE ACCUMULATOR
    - FOR EACH ELEMENT OF THE COLLECTION, DO:
      - RECURSE PROCESS TO GET DIGEST VALUE
      - ACCUMULATE DIGEST INTO COMMUTATIVE ACCUMULATOR
    - RETURN ACCUMULATED RESULT FROM COMMUTATIVE ACCUMULATOR
  - IF INSTEAD ELEMENT PATH RESOLVES TO ORDERED COLLECTION:
    - INITIALIZE A NONCOMMUTATIVE ACCUMULATOR
    - FOR EACH ELEMENT OF THE COLLECTION, DO:
      - RECURSE PROCESS TO GET DIGEST VALUE
      - ACCUMULATE DIGEST INTO NONCOMMUTATIVE ACCUMULATOR
    - RETURN ACCUMULATED RESULT FROM NONCOMMUTATIVE ACCUMULATOR
- TO FIG. 3B

- FROM FIG. 3A
- IF INSTEAD ELEMENT TYPE IS AN OBJECT:
  - INITIALIZE A COMMUTATIVE ACCUMULATOR
  - FOR EACH ENTRY OF OBJECT (KEY-VALUE PAIR):
    - COMPUTE PATH
    - INITIALIZE NONCOMMUTATIVE ACCUMULATOR
    - RECURSE PROCESS FOR ENTRY KEY
    - ACCUMULATE ENTRY KEY DIGEST INTO NONCOMMUTATIVE ACCUMULATOR
    - RECURSE PROCESS FOR ENTRY VALUE
    - ACCUMULATE ENTRY VALUE DIGEST INTO NONCOMMUTATIVE ACCUMULATOR
    - GET ACCUMULATED ENTRY RESULT FROM NONCOMMUTATIVE ACCUMULATOR
    - ACCUMULATE ENTRY RESULT INTO COMMUTATIVE ACCUMULATOR
  - RETURN ACCUMULATED DIGEST RESULT FROM COMMUTATIVE ACCUMULATOR
- IF INSTEAD ELEMENT TYPE IS NOT A COLLECTION NOR AN OBJECT (SIMPLE VALUE)
  - RETURN A DIGEST COMPUTED FROM VALUE USING DIGESTER;

ONCE COMPLETED FOR EACH DATA STRUCTURE, COMPARE DIGEST VALUES. TWO SAME DIGEST VALUES INDICATE STRUCTURES ARE EQUIVALENT.

FIG. 3B

| 900 | | |
|---|---|---|
| - ALICE...  910<br>((2/3) + (5/(7+11)) + (13/(17/19)))<br>- BOB...<br>((2/23) + (5/(29+31)) + (13/(37/41))) | - BOB...  940<br>((2/23) + (13/(37/41)) + (5/(29+31)))<br>- ALICE...<br>((2/3) + (5/(11+7)) + (13/(17/19))) | |
| ((2/3) + (5/(7+11)) + (13/(17/19)))  920<br>+<br>((2/23) + (5/(29+31)) + (13/(37/41))) | ((2/23) + (13/(37/41)) + (5/(29+31)))  950<br>+<br>((2/3) + (5/(11+7)) + (13/(17/19))) | |
| 30.07955147  930 | 30.07955147  960 | |

FIG. 9

MULTI-LEVEL DATA STRUCTURE COMPARISON USING COMMUTATIVE DIGESTING FOR UNORDERED DATA COLLECTIONS

FIELD

The field relates generally to information processing systems, and more particularly to techniques for processing data structures.

BACKGROUND

Software systems are increasingly able to process large and complex data structures. Many data structures contain various kinds of data collections. In some of these data collections, the ordering of the elements within a given data collection does not have any meaning. Such an unordered data collection is often referred to as a multiset or a bag and does not need to be sorted.

A difficulty arises when data containing such unordered data collections needs to be compared. A number of existing comparison tools compare two data structures by iterating over both data structures to compare elements sharing the same position. This works well except when data contains unordered collections.

For smaller sized data, it is possible to sort those collections based on an arbitrary order to then use a comparison tool. When data comprises multiple levels of embedded collections, however, it quickly becomes impractical to sort.

A need exists for improved techniques for comparing multi-level data structures comprising unordered collections.

SUMMARY

In one embodiment, an exemplary method comprises obtaining at least two multi-level data structures, wherein at least one of the multi-level data structures comprises an unordered data collection; determining a data structure digest value for each of the at least two multi-level data structures by accumulating a data element digest value for each data element of the respective multi-level data structure, wherein a data element digest value for a given data element comprising an unordered data collection is determined using a commutative accumulator function; and evaluating a similarity of the at least two multi-level data structures by comparing the respective data structure digest values.

In some embodiments, the commutative accumulator function aggregates a digest value for each data element of the unordered data collection using one or more commutative operations. A data element digest value for a given data element comprising an ordered data collection can be determined using a noncommutative accumulator function that aggregates a digest value for each data element of the ordered data collection using one or more noncommutative operations.

Other illustrative embodiments include, without limitation, apparatus, systems, methods and computer program products comprising processor-readable storage media.

BRIEF DESCRIPTION OF THE DRAWINGS

FIGS. 2A through 2D illustrate exemplary multi-level data structures comprising unordered data collections, according to some embodiments of the disclosure;

FIGS. 3A and 3B, collectively, illustrate exemplary pseudo code for a multi-level data structure comparison process, according to one embodiment of the disclosure;

FIG. 9 illustrates an exemplary computation of a digest value for the tree representation of FIG. 2D of the exemplary multi-level data structure of FIG. 2A, according to one or more embodiments of the disclosure;

DETAILED DESCRIPTION

Figure 1A:
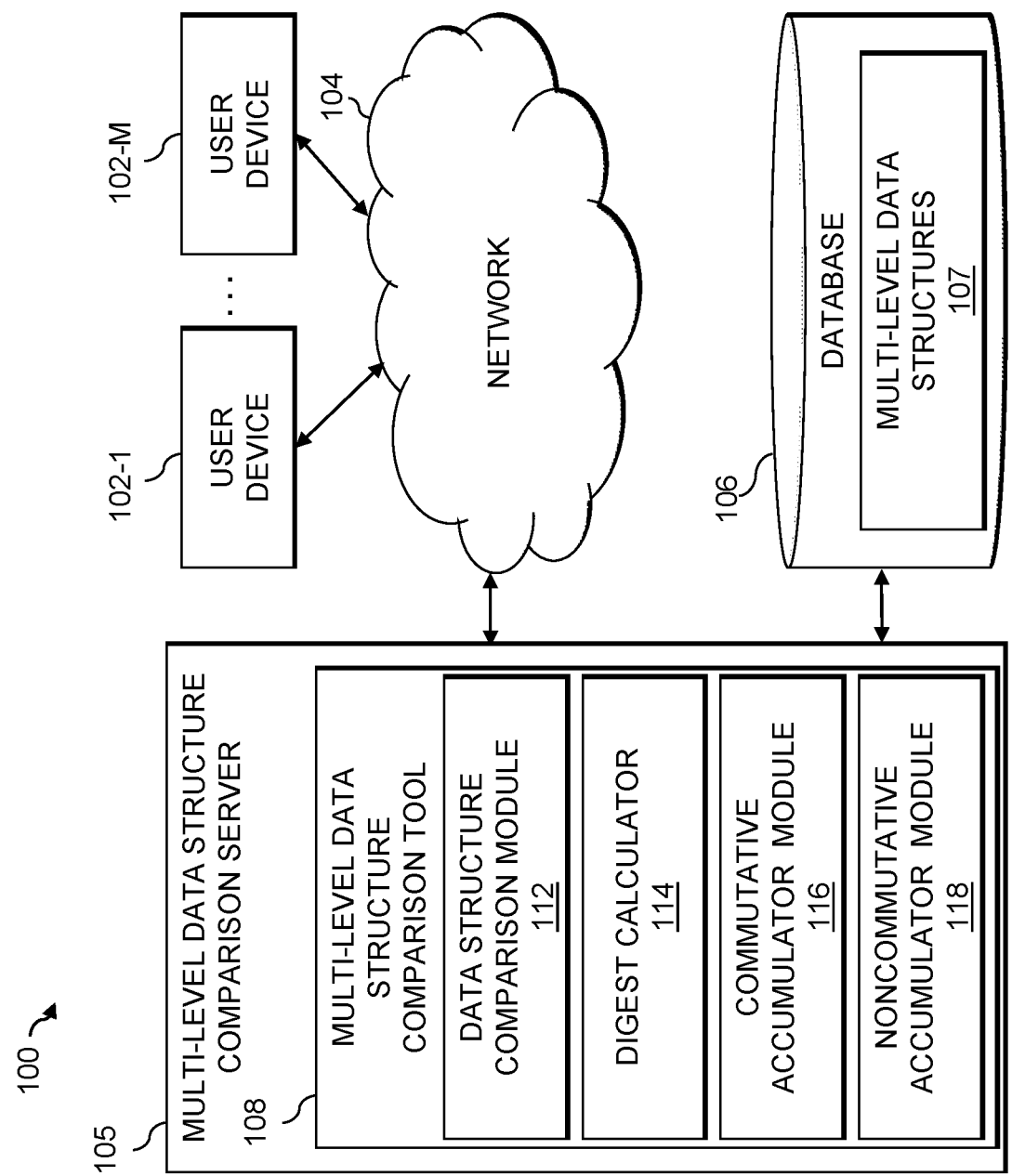
FIGS. 1A through 1C illustrate information processing systems configured for multi-level data structure comparison in a number of illustrative embodiments.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for comparing multi-level data structures using commutative digesting for unordered data collections.

In one or more embodiments, multi-level data structure comparison techniques are provided that compare at least two multi-level data structures having at least one unordered data collection by (i) determining a data structure digest value for each of the multi-level data structures by accumulating, within each multi-level data structure, a data element digest value for each data element of the respective multi-level data structure; and (ii) evaluating a similarity of the multi-level data structures by comparing the respective data structure digest values. According to one aspect of the disclosure, a data element digest value for a given data element comprising an unordered data collection is determined using a commutative accumulator function.

The multi-level data structures may comprise, for example, a mix of data collections and data objects spread on multiple levels. The disclosed multi-level data structure comparison techniques may be used, for example, for testing and debugging purposes (e.g., to compare computed data with expected data). In further variations, the disclosed multi-level data structure comparison techniques may be used to determine or verify if data changed without needing to know what portions of the multi-level data structure changed. As discussed further below in conjunction with FIG. 1C, the disclosed multi-level data structure comparison techniques can be employed to provide data to a resource-intensive process or application (e.g., a caching process) only when a data change is detected in a multi-level data structure (in order that resource-intensive process is not executed unnecessarily).

In some embodiments, the disclosed multi-level data structure comparison techniques generate a digest value for each element (or node) of a given multi-level data structure. The digest function shares some properties with cryptographic hash functions in at least some embodiments, such as being deterministic, quick to compute, and having an avalanche effect and very low collision probability.

The digest value is generated differently, according to at least one embodiment of the disclosure, based on the configured collection type (e.g., whether a given collection is ordered or unordered). For ordered collections and key-value entries, the digest value is generated by accumulating the digest values of its elements using a noncommutative operation to obtain a different result for every different ordering of their elements. For unordered collections (including objects as an unordered collection of key-value entries), the digest value is generated by accumulating the digest values of its elements using a commutative operation to generate a digest value that will be the same regardless of the iteration order. The digest value is generated recursively from the leaf nodes up to the root node of all data structures to process. If the digest value of a given multi-level data structure matches the digest value of another multi-level data structure (or the same multi-level data structure at a different point in time), their data can be considered to be equal.

As noted above, software systems are increasingly able to process large and complex data structures. Many data structures comprise various kinds of data collections. In unordered data collections, the ordering of the elements within a given data collection does not have any meaning and the data collections do not need to be sorted. In ordered data collections, on the other hand, the ordering of the elements within a given data collection has a meaning and are often said to have a meaningful order.

These data structures are often serialized using common human readable representations, such as YAML (a recursive acronym for "YAML Ain't Markup Language"), JSON ("JavaScript Object Notation") and XML ("Extensible Markup Language"). These data representation languages do not have notions of unordered collections (e.g., they treat all collections in the same manner as a sequence of elements).

A difficulty arises when data containing such unordered data collections needs to be compared. Two unordered data collections cannot be expected to share the same order in their elements. A number of existing comparison tools compare two data structures by iterating over both data structures to compare elements sharing the same position.

FIG. 1A shows a computer network (also referred to herein as an information processing system) 100 configured in accordance with an illustrative embodiment. The computer network 100 comprises a plurality of user devices 102-1, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1A embodiment.

Also coupled to network 104 is a multi-level data structure comparison server 105, discussed further below. As noted above, a configuration microservice typically manages configuration items needed by a consumer microservice to do its tasks. In the case of storage and retrieval of more generic data items, the configuration microservice may be more generally referred to as a supplier microservice that manages data items needed by a consumer microservice to do its tasks.

The exemplary multi-level data structure comparison server 105 of FIG. 1A comprises a multi-level data structure comparison tool 108 comprising a data structure comparison module 112, a digest calculator module 114, a commutative accumulator module 116 and a noncommutative accumulator module 118. As discussed hereinafter, the exemplary data structure comparison module 112 employs the digest calculator module 114, commutative accumulator module 116 and noncommutative accumulator module 118, at least in some embodiments, for each comparison of multi-level data structures.

Additionally, the multi-level data structure comparison server 105 can have an associated database 106 configured to store multi-level data structures 107. As noted above, multi-level data structures 107 comprise various kinds of data collections (e.g., unordered data collections and ordered data collections).

The database 106 in the present embodiment is implemented using one or more storage systems associated with the multi-level data structure comparison server 105. Such storage systems can comprise any of a variety of different types of storage including network-attached storage (NAS), storage area networks (SANs), direct-attached storage (DAS) and distributed DAS, as well as combinations of these and other storage types, including software-defined storage.

It is to be appreciated that this particular arrangement of modules 112, 114, 116 and 118 illustrated in the multi-level data structure comparison server 105 of the FIG. 1A embodiment is presented by way of example only, and alternative arrangements can be used in other embodiments. For example, the functionality associated with modules 112, 114, 116 and 118 in other embodiments can be combined into a single processing entity, or separated across a larger number of processing entities. In addition, the functionality associated with one or more of modules 112, 114, 116 and 118 can be separated across a number of processing entities. As another example, multiple distinct processors can be used to implement different ones of modules 112, 114, 116 and 118 or portions thereof. At least portions of modules 112, 114, 116 and 118 may be implemented at least in part in the form of software that is stored in memory and executed by a processor.

The user devices 102 may comprise, for example, computing devices such as mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective processing devices associated with a particular company, organization or other enterprise or group of users. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Also associated with the multi-level data structure comparison server 105 can be one or more input-output devices, which illustratively comprise keyboards, displays or other types of input-output devices in any combination. Such input-output devices can be used, for example, to support one or more user interfaces to the multi-level data structure comparison server 105, as well as to support communication between the multi-level data structure comparison server 105 and other related systems and devices not explicitly shown.

The user devices 102 and the multi-level data structure comparison server 105 in the FIG. 1A embodiment are assumed to be implemented using at least one processing device. Each such processing device generally comprises at least one processor and an associated memory, and implements one or more functional modules for controlling certain features of the multi-level data structure comparison server 105.

More particularly, user devices 102 and/or multi-level data structure comparison server 105 in this embodiment each can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the user devices 102 and/or the multi-level data structure comparison server 105 to communicate over the network 104 with each other (as well as one or more other networked devices), and illustratively comprises one or more conventional transceivers.

It is to be understood that the particular set of elements shown in FIG. 1A for multi-level data structure comparison is presented by way of illustrative example only, and in other embodiments additional or alternative elements may be used. Thus, another embodiment includes additional or alternative systems, devices and other network entities, as well as different arrangements of modules and other components.

It is noted that while the exemplary multi-level data structure comparison tool 108 of FIG. 1A executes on multi-level data structure comparison server 105 (typically as a virtual layer through Infrastructure as a Service (IaaS) or Platform as a Service (PaaS)), other implementations are possible, as would be apparent to a person of ordinary skill in the art.

Exemplary processes utilizing modules 112, 114, 116 and 118 of the exemplary multi-level data structure comparison server 105 in computer network 100 will be described in more detail with reference to FIGS. 3 through 8.

Figure 1B:
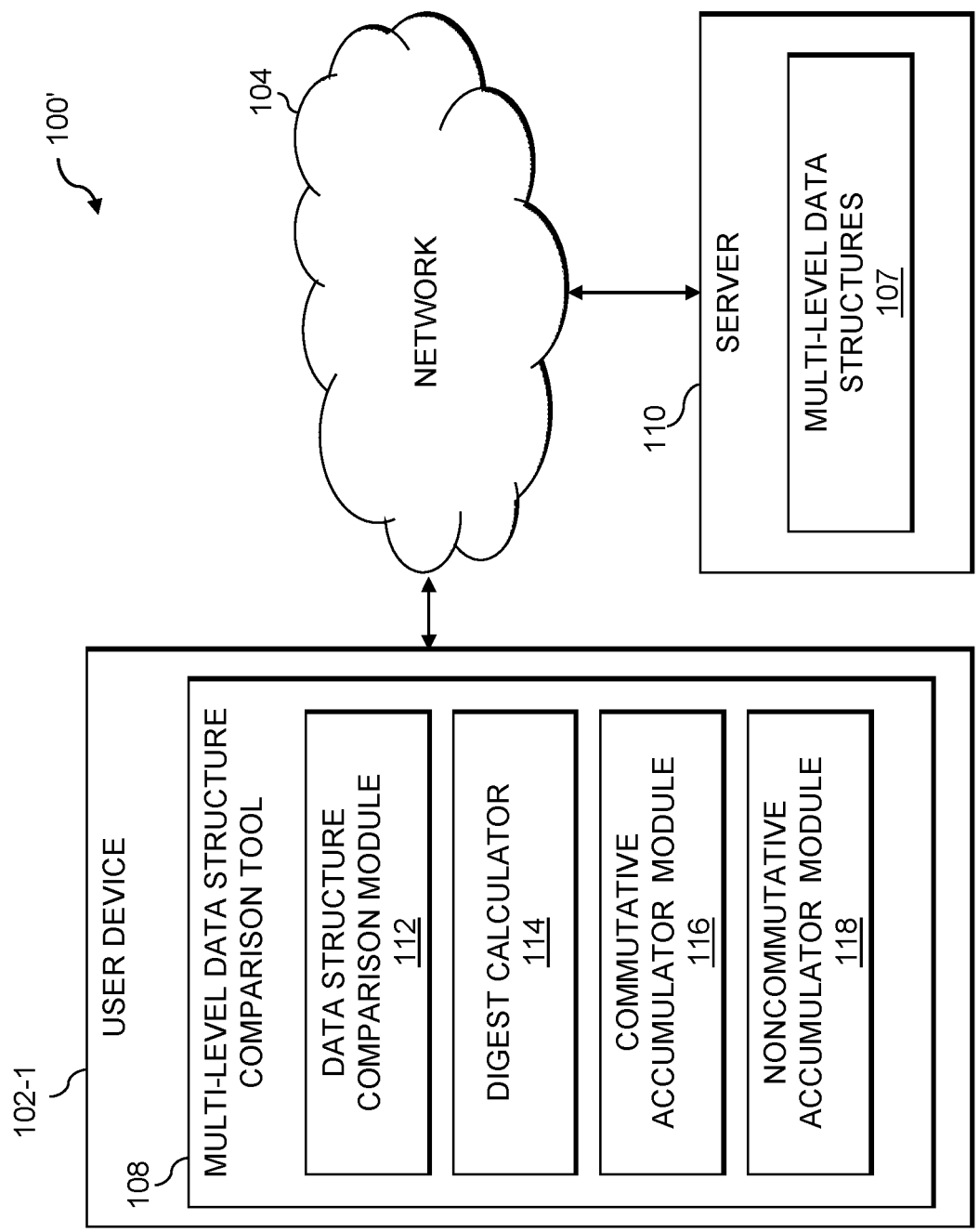

FIG. 1B illustrates a variation 100' of the computer network 100 of FIG. 1A according to an alternate configuration. In the embodiment of FIG. 1B, a given user device, such as user device 102-1, includes the multi-level data structure comparison tool 108 of the FIG. 1A embodiment to perform the disclosed multi-level data structure comparison techniques on the client side. The modules 112, 114, 116 and 118 of the exemplary multi-level data structure comparison tool 108 in the FIG. 1B embodiment operate in a similar manner as the corresponding elements of the FIG. 1A embodiment.

Elements 100' and 104 are both referred to herein as examples of "networks" in a similar manner as the corresponding elements of the FIG. 1A embodiment.

Also coupled to network 104 is a server 110 that exposes multi-level data. As shown in FIG. 1B, the server 110 comprises multi-level data structures 107, in a similar manner as the database 106 of FIG. 1A.

It is noted that while the exemplary server 110 may be implemented as a virtual layer through IaaS or PaaS, other implementations are possible, as would be apparent to a person of ordinary skill in the art.

The multi-level data structure comparison tool 108 of the FIG. 1A embodiment allows the user device 102-1 to perform the disclosed multi-level data structure comparison techniques to compare multi-level data structures within multi-level data structures 107, as discussed further below in conjunction with FIGS. 3 through 8.

Figure 1C:
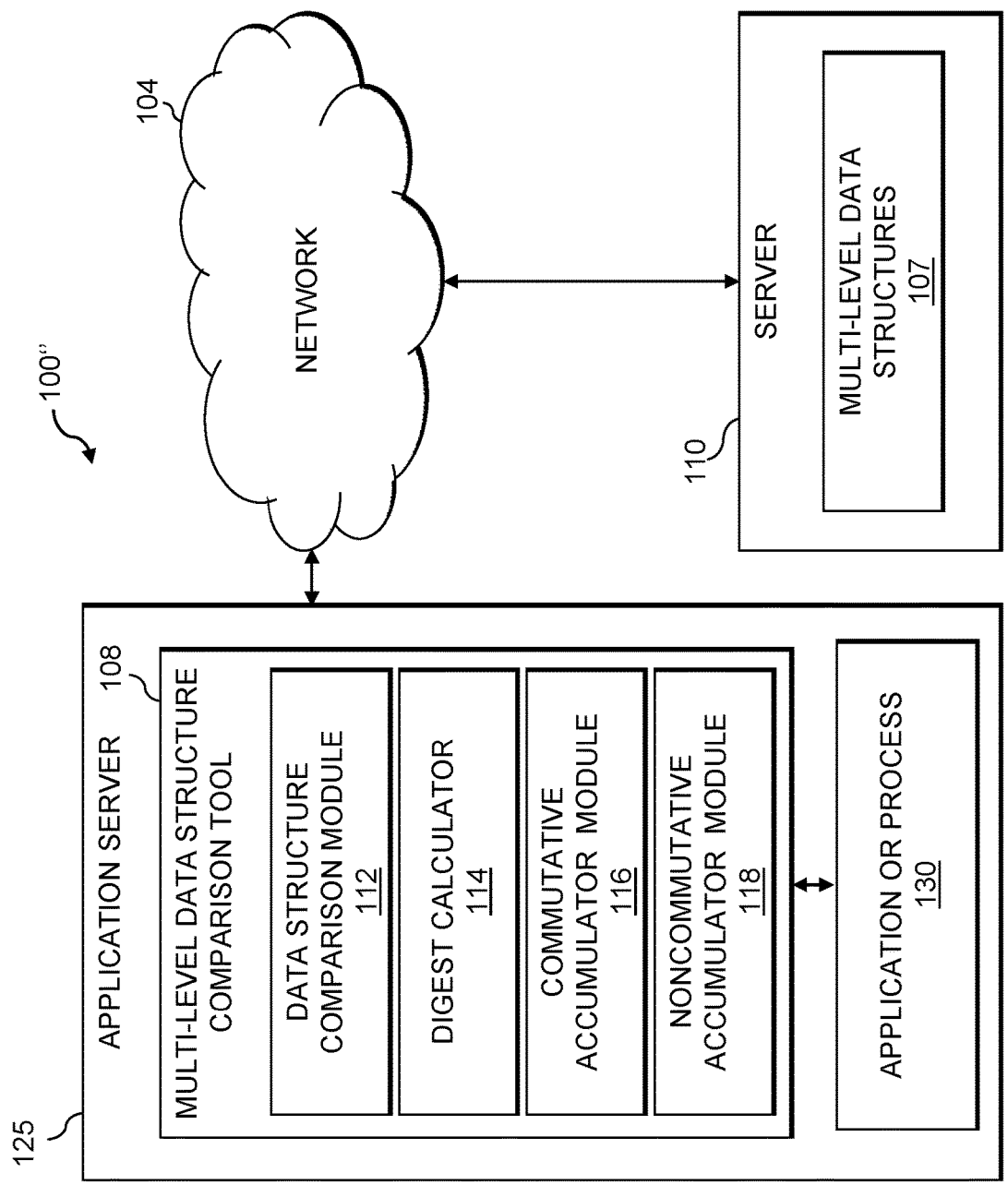

FIG. 1C illustrates another variation 100" of the computer network 100 of FIG. 1A according to another alternate configuration. In the embodiment of FIG. 1C, an application server 125 includes the multi-level data structure comparison tool 108 (or a multi-level data structure comparison library) of the FIG. 1A embodiment to perform the disclosed multi-level data structure comparison techniques on the client side. In addition, the exemplary application server 125 also hosts one or more applications 130 (or processes). The modules 112, 114, 116 and 118 of the exemplary multi-level data structure comparison tool 108 and the server 110 in the FIG. 1C embodiment operate in a similar manner as the corresponding elements of the FIG. 1B embodiment.

The multi-level data structure comparison tool 108 in the embodiment of FIG. 1C triggers the application or process 130 to perform predefined functionality, for example, when the multi-level data comparison indicates that at least some of the multi-level data structures 107 exposed by the server 110 have changed. For example, the multi-level data structure comparison tool 108 can trigger the predefined functionality of the application or process 130 in situations where the predefined functionality consumes significant processing, network and/or memory resources.

Elements 100″ and 104 are both referred to herein as examples of "networks" in a similar manner as the corresponding elements of the FIG. 1A embodiment.

Figure 2D:
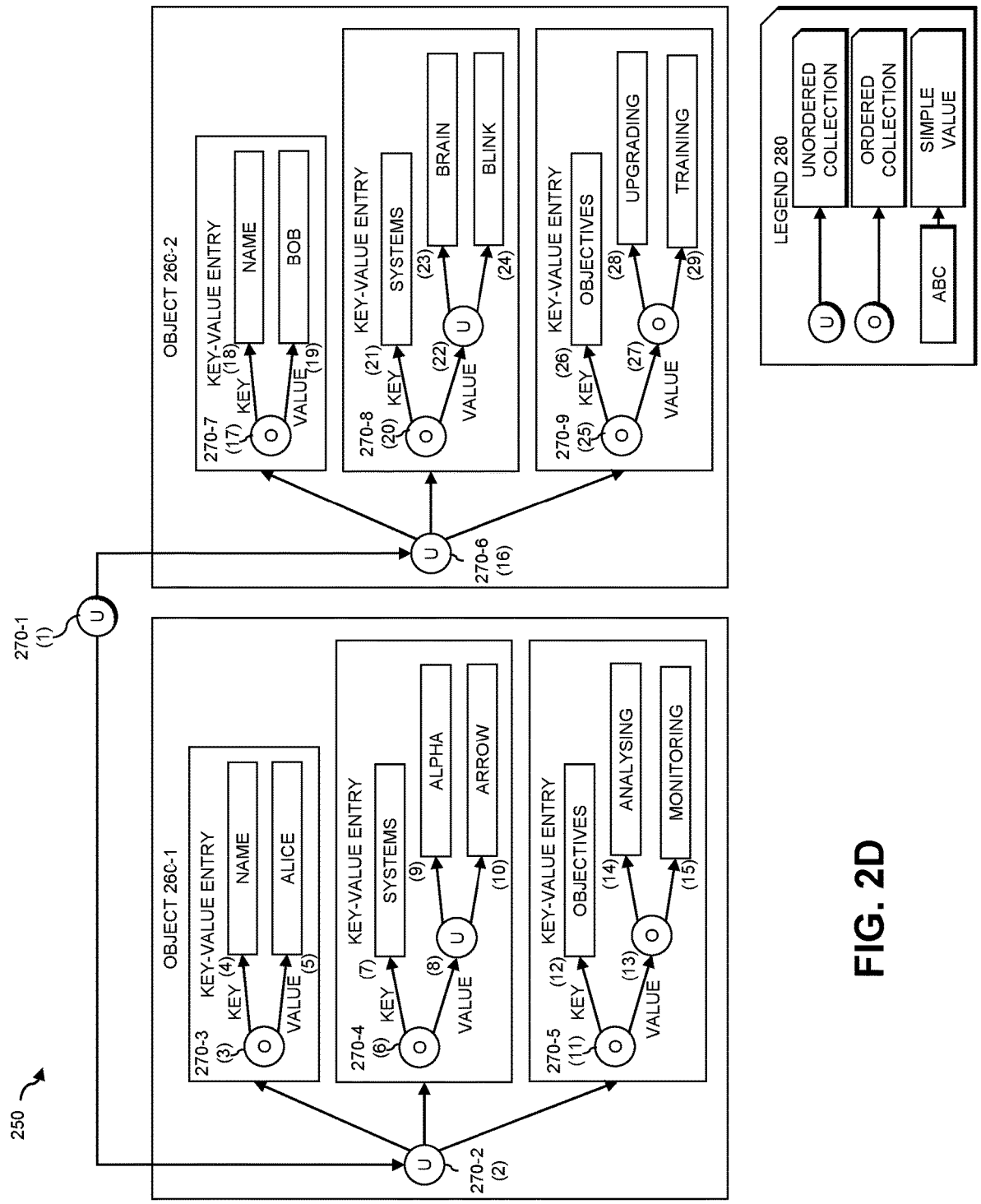

FIGS. 2A through 2D illustrate exemplary multi-level data structures comprising unordered data collections, according to some embodiments of the disclosure. In the example of FIG. 2A, an exemplary multi-level data structure 200 corresponds to an administrator object, where each administrator object comprises a name field 212, a list of managed systems 214 and a list of objectives 216 in priority order. Since the ordering of the objectives list 216 is meaningful to define which objective comes first, the objectives list 216 is an ordered data collection. Since the ordering of the administrator list and systems list has no meaning, the administrator list and managed systems list 214 are an unordered data collection. The multi-level data structure 200 of FIG. 2A comprises one object for each exemplary administrator, Alice and Bob.

The exemplary administrator object for Alice comprises her name in name field 212, managed systems list 214 comprising Alpha and Arrow, and objectives list 216 comprising analyzing and monitoring, in priority order. Likewise, the exemplary administrator object for Bob comprises his name in name field 212, managed systems list 214 comprising Brain and Blink, and objectives list 216 comprising upgrading and training, in priority order.

FIG. 2B illustrates the exemplary multi-level data structure 200 of FIG. 2A in a YAML format, comprising an exemplary administrator object 210-1 for Alice and an exemplary administrator object 210-2 for Bob, with the same data as the multi-level data structure 200 of FIG. 2A. In addition, the exemplary administrator objects 210 in FIG. 2B indicate digest values in parenthesis for each data element. In the example of FIG. 2B, the digest values are simplified for ease of discussion. In some embodiments, the digest values can be computed using a hash function, such as an MD5 hash generator, a SHA1 hash generator and/or a SHA256 hash generator, for example. The MD5 hash value for data element "Alice" can be expressed as "64489C85DC2FE0787B85CD87214B3810." Simple values can be converted to a byte array or any other data format accepted by the employed hash function.

The digest values will be discussed further below in conjunction with the representation of FIG. 2D. In some embodiments, a data structure digest value can be determined for each multi-level data structure by accumulating, within a given multi-level data structure, a data element digest value for each data element of the given multi-level data structure. A data element digest value for a given data element comprising an unordered data collection is determined in at least some embodiments using a commutative accumulator function. The disclosed multi-level data structure comparison techniques scan the given multi-level data structure to digest each value, starting with the leaf nodes. The multi-level data structure comparison process continues recursively from the leaf nodes to the root node until a final data structure digest value is obtained determined for the multi-level data structure. If the data structure digest value is the same for two multi-level data structures, the two multi-level data structures comprise the same data (or the same multi-level data structure has not changed over time).

Once each data element of a list is digested, the digest value can be computed for the list itself. In one or more embodiments, for an unordered list, a commutative operation, such as simple addition, is used to aggregate the digest value for each element. Likewise, for an ordered list, a noncommutative operation, such as simple division, is used to aggregate the digest value for each element.

FIG. 2C illustrates the exemplary multi-level data structure 200 of FIG. 2A in a JSON format 220, comprising exemplary administrator objects for Alice and Bob, with the same data as the multi-level data structure 200 of FIG. 2A.

FIG. 2D illustrates the exemplary multi-level data structure 200 of FIG. 2A using a tree representation 250, comprising exemplary administrator objects 260-1 and 260-2 for Alice and Bob, respectively, with the same data as the multi-level data structure 200 of FIG. 2A. The objects in the tree representation 250 are processed as key-value entries. The legend 280 indicates the notation used to distinguish unordered data collections, ordered data collections and simple values (such as "ABC").

The tree representation 250 comprises a root node 270-1, corresponding to an unordered data collection with a list of administrators. The administrator object 260-1 for Alice, for example, comprises a plurality of nodes, such as representative nodes 270-2, 270-3, 270-4 and 270-5. The digest value for each node is shown in parentheses adjacent to the corresponding node. Likewise, the administrator object 260-2 for Bob comprises a plurality of nodes, such as representative nodes 270-6, 270-7, 270-8 and 270-9. The digest value for each node is shown in parentheses adjacent to the corresponding node.

FIGS. 3A and 3B, collectively, illustrate exemplary pseudo code for a multi-level data structure comparison process 300-A and 300-B (collectively, referred to herein as multi-level data structure comparison process 300), according to one embodiment of the disclosure. The exemplary multi-level data structure comparison process 300 employs (i) a deterministic hash function, such as MD5, SHA1, and/or SHA256, that provides a fixed length result, an avalanche effect and a low collision probability; (ii) a Commutative Accumulator (CA), for example, provided by the commutative accumulator module 116 of FIG. 1 to accumulate results in a fixed length using a commutative operation (e.g., a scalar addition with overflow); and (iii) a Noncommutative Accumulator (NA), for example, provided by the noncommutative accumulator module 118 of FIG. 1, to accumulate results in a fixed length using a noncommutative operation, (e.g., a matrix multiplication). In one or more embodiments, the multi-level data structure comparison process 300 expresses paths to data elements in a tree representation, for example, using a notation that concatenates identifiers or a query language, such as JSONPath. The current path is used to determine if a given node in the tree representation is an ordered collection. The exemplary multi-level data structure comparison process 300 is provided a current data element to process, a parent data element path, and a configuration to specify which paths to consider ordered or unordered collections.

As shown in FIG. 3A, the exemplary multi-level data structure comparison process 300-A performs the following steps for collections:

Compute path;
      If element type is a collection:
        If element path resolves to unordered collection:
          Initialize a CA
          For each element of the collection, do:
            Recurse process to get digest value; and
            Accumulate digest into CA;
          Return accumulated result from CA.
        If instead element path resolves to ordered collection:
          Initialize a NA;

For each element of the collection, do:
  Recurse process to get digest value; and
  Accumulate digest into NA;
Return accumulated result from NA.

As shown in FIG. 3B, the exemplary multi-level data structure comparison process 300-B continues with the following steps for objects and simple values:

If instead element type is an object:
  Initialize a CA;
  For each entry of object (key-value pair):
    Compute path;
    Initialize NA;
    Recurse process for entry key;
    Accumulate entry key digest into NA;
    Recurse process for entry value;
    Accumulate entry value digest into NA;
    Get accumulated entry result from NA; and
    Accumulate entry result into CA;
  Return accumulated digest result from commutative accumulator CA.

If instead element type is not a collection or an object (simple value):
  Return a digest computed from value using digester;

Once the exemplary multi-level data structure comparison process 300 is completed for each data structure, the digest values are compared (and the same digest values indicate that the structures are equivalent).

FIGS. 4 through 7, collectively, comprise a flow chart illustrating an exemplary implementation of a multi-level data structure comparison process 400-A through 400-D, respectively, according to one embodiment of the disclosure.

Figure 4:
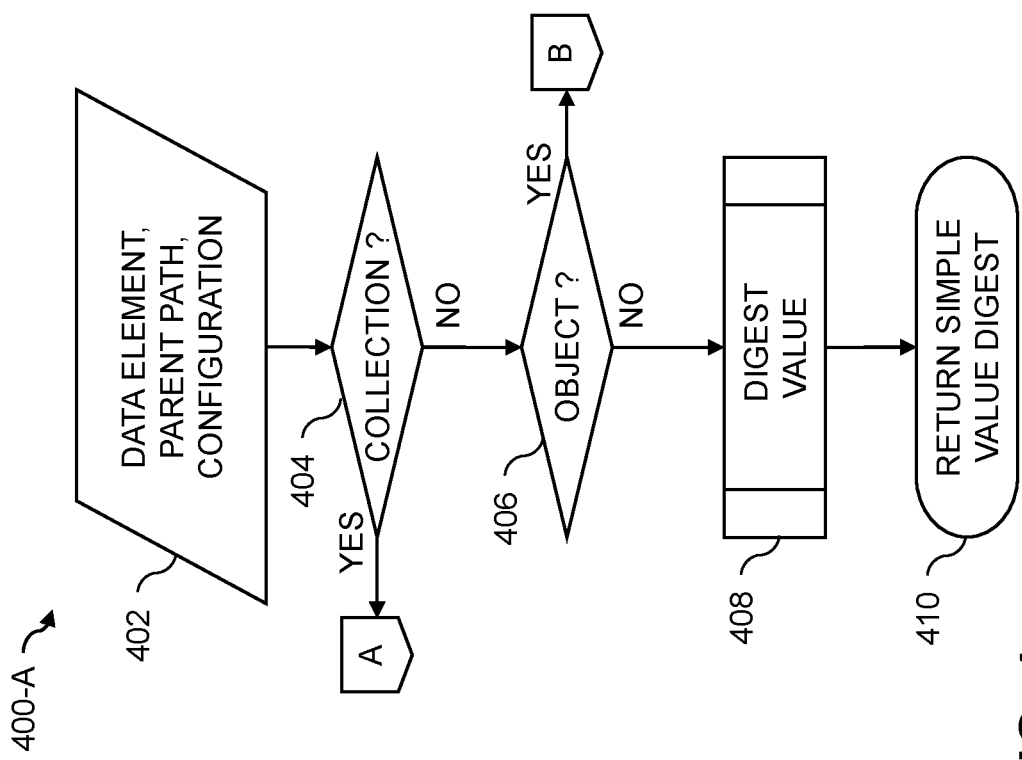
FIGS. 4 through 7, collectively, comprise a flow chart illustrating an exemplary implementation of a multi-level data structure comparison process, according to at least one embodiment of the disclosure.

As shown in FIG. 4, the exemplary multi-level data structure comparison process 400-A receives a data element, parent path and configuration information during step 402. A test is performed during step 404 to determine if the data element is a collection. If it is determined during step 404 that the data element is a collection, program control proceeds to FIG. 5, discussed below.

If, however, it is determined during step 404 that the data element is not a collection, a further test is performed during step 406 to determine if the data element is an object. If it is determined during step 406 that the data element is an object, program control proceeds to FIG. 6, discussed below. If, however, it is determined during step 406 that the data element is not an object, a digest value is computed for the data element during step 408 and is returned during step 410.

Figure 5:
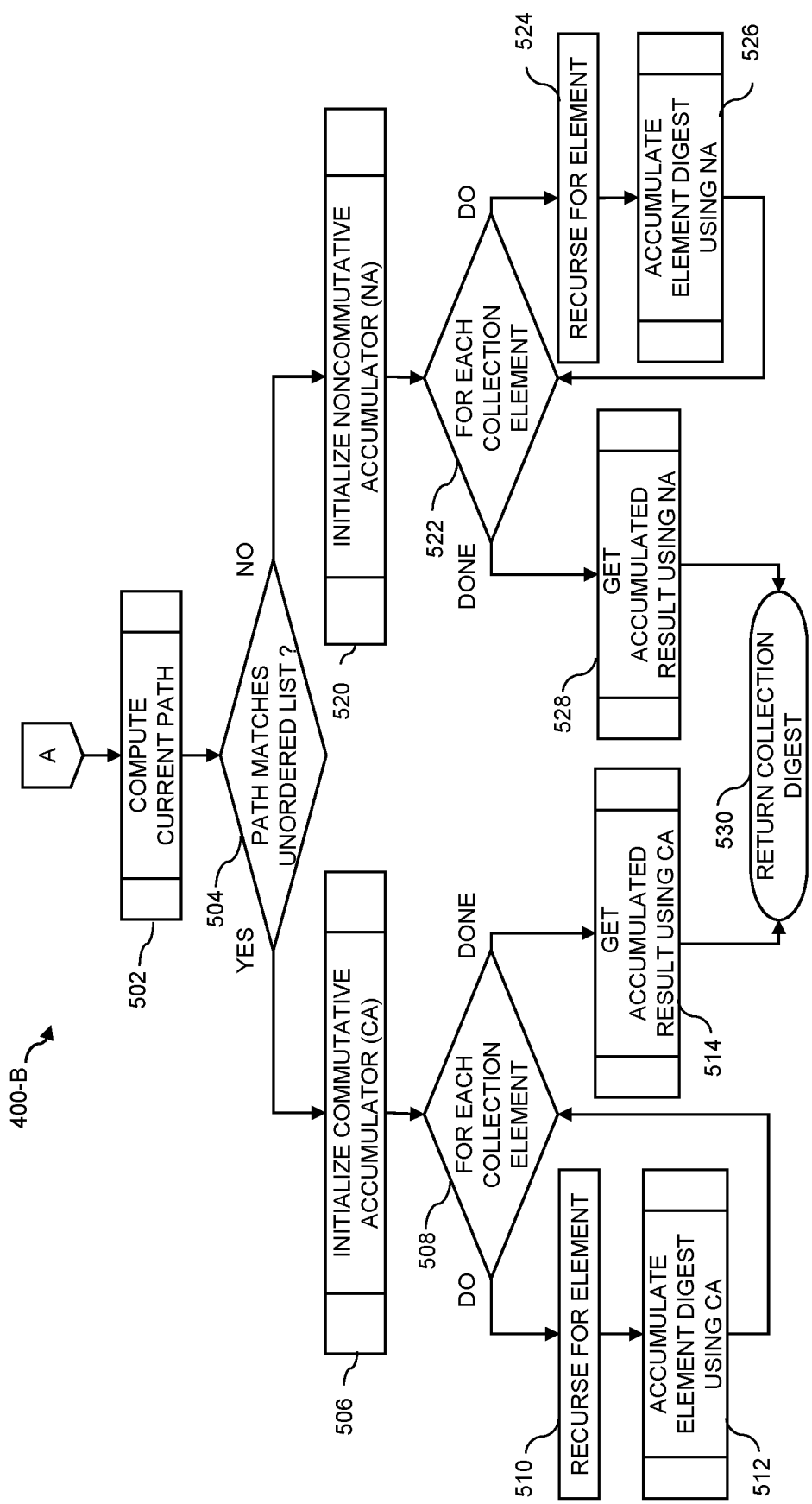

As shown in FIG. 5, the exemplary multi-level data structure comparison process 400-B computes the current path for the data element during step 502 (after it was determined during step 404 that the data element is a collection). A test is performed during step 504 to determine if the current path matches an unordered list. If it is determined during step 504 that the current path matches an unordered list, the commutative accumulator is initialized during step 506.

A further test is performed during step 508 until each element of the collection has been processed. If it is determined during step 508 that another collection element needs to be processed, the multi-level data structure comparison process 400-B recurses for each data element in the collection during step 510 and accumulates the element digest using the commutative accumulator during step 512.

Once it is determined during step 508 that each element of the collection has been processed, the accumulated result is obtained from the commutative accumulator during step 514 and the collection digest value is returned during step 530.

If, however, it is determined during step 504 that the current path does not match an unordered list, the noncommutative accumulator is initialized during step 520.

A further test is performed during step 522 until each element of the collection has been processed. If it is determined during step 522 that another collection element needs to be processed, the multi-level data structure comparison process 400-B recurses for each data element in the collection during step 524 and accumulates the element digest using the noncommutative accumulator during step 526.

Once it is determined during step 522 that each element of the collection has been processed, the accumulated result is obtained from the noncommutative accumulator during step 528 and the collection digest value is returned during step 530.

Figure 6:
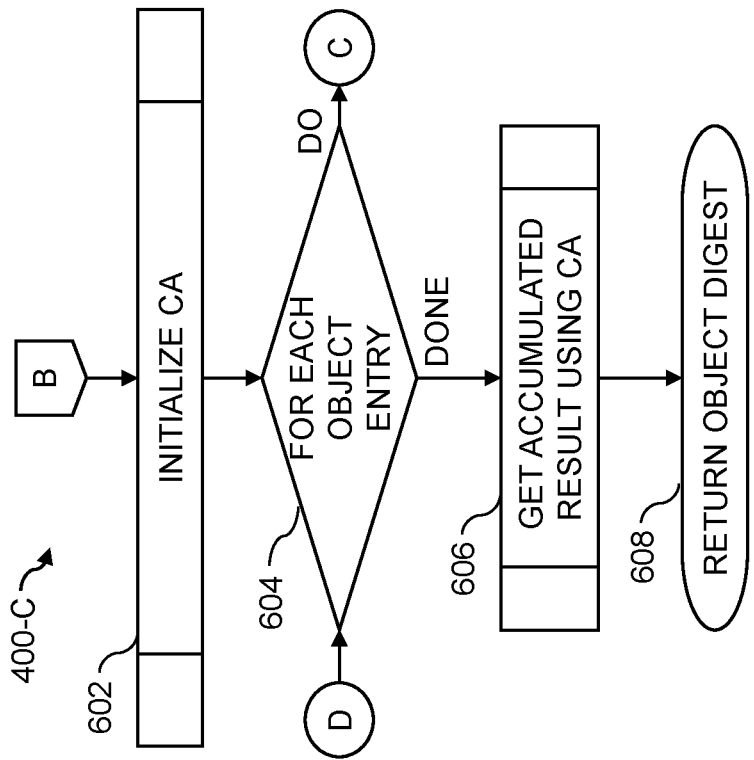

As shown in FIG. 6, the exemplary multi-level data structure comparison process 400-C initializes the commutative accumulator during step 602 (after it was determined during step 406 that the data element is an object). A test is performed during step until each object entry of the object has been processed. If it is determined during step 604 that another object entry needs to be processed, program control proceeds to FIG. 7, discussed hereinafter. Once it is determined during step 604 that each object entry of the object has been processed, the accumulated result is obtained from the commutative accumulator during step 606 and the object digest value is returned during step 608.

Figure 7:
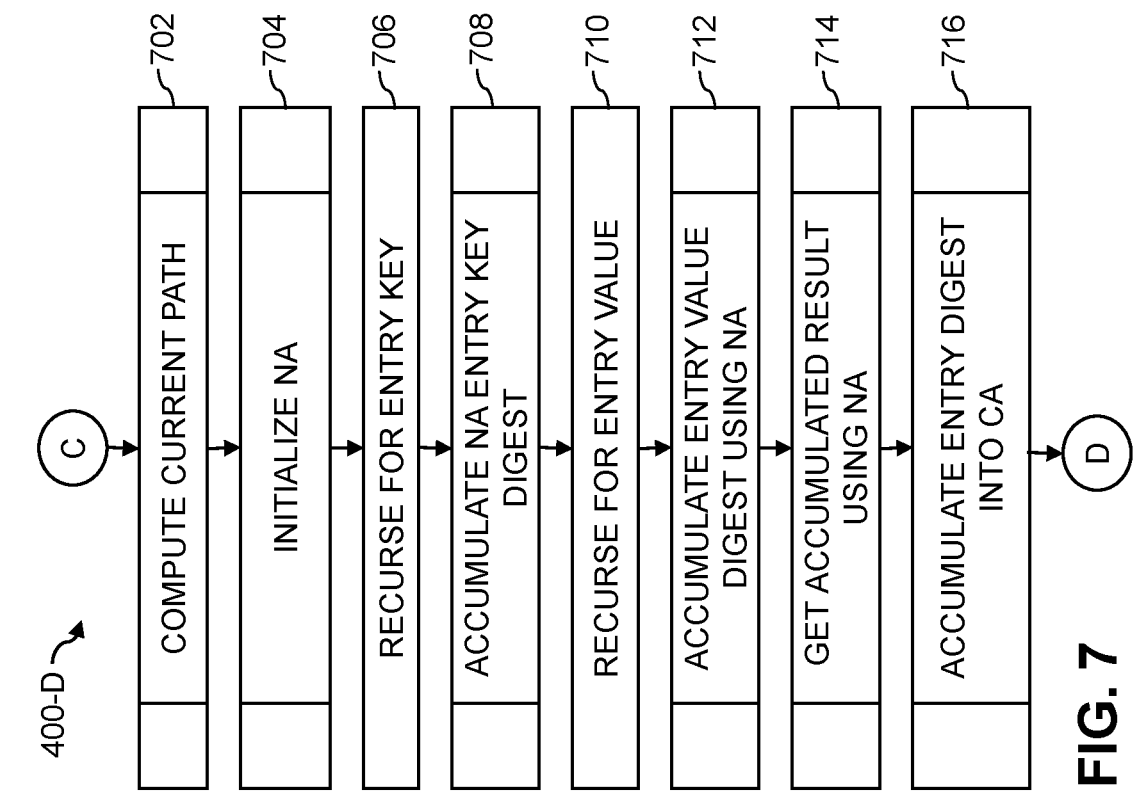

As shown in FIG. 7, the exemplary multi-level data structure comparison process 400-D computes the current path for the object entry of the object during step 702 (after it was determined during step 604 that an object entry of the object remains to be processed). The noncommutative accumulator is then initialized during step 704. The multi-level data structure comparison process 400-D then processes the keys of the key-value entry by recursing for each entry key in the object entry during step 706 and accumulates the entry key digest value using the noncommutative accumulator during step 708.

The multi-level data structure comparison process 400-D then processes the values of the key-value entry by recursing for each entry value in the object entry during step 710 and accumulates the entry value digest value using the noncommutative accumulator during step 712. The accumulated result is obtained from the noncommutative accumulator during step 714 and the entry digest value is returned during step 716. Program control proceeds to step 604 of FIG. 6 to process another object entry, if any, in the manner described above.

Figure 8:
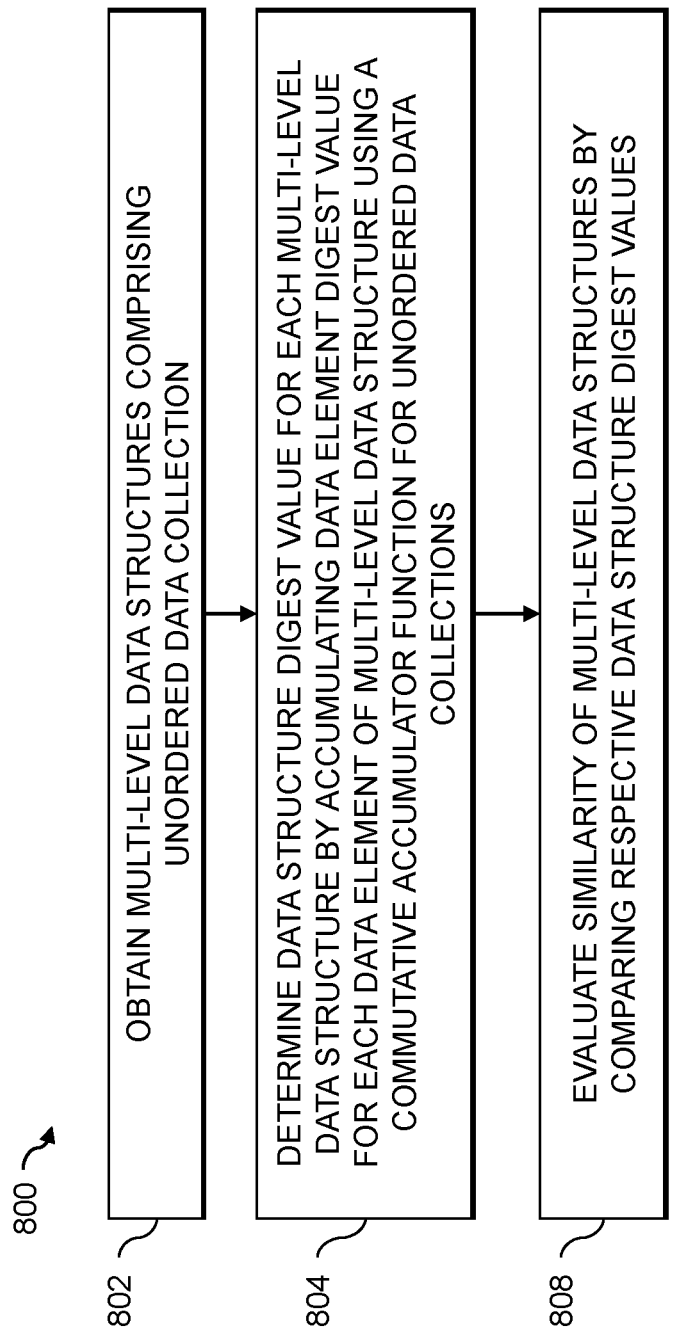
FIG. 8 is a flow chart illustrating an exemplary implementation of a multi-level data structure comparison process, according to an embodiment.

FIG. 8 is a flow chart illustrating an exemplary implementation of a multi-level data structure comparison process 800, according to an embodiment. As shown in FIG. 8, the exemplary multi-level data structure comparison process 800 initially obtains multi-level data structures comprising an unordered data collection during step 802.

During step 804, a data structure digest value is determined for each multi-level data structure by accumulating, within each multi-level data structure, a data element digest value for each data element of the respective multi-level data structure. A data element digest value for a given data element comprising an unordered data collection is determined during step 804 using a commutative accumulator function.

Finally, a similarity of the multi-level data structures is evaluated during step 808 by comparing the respective data structure digest values.

FIG. 9 illustrates an exemplary computation 900 of a digest value for the tree representation 250 (FIG. 2D) of the exemplary multi-level data structure 200 of FIG. 2A, according to one or more embodiments. As noted above, it is assumed that the configuration information for the tree representation 250 indicates that administrators are unordered data collections (.); systems are unordered data collections (.[ ].systems) and objectives are ordered data collections (.[ ].objectives).

The disclosed multi-level data structure comparison techniques initially start with a state to compute a digest value of a previous collection of administrator objects. It is determined that the starting state at root node 270-1 (FIG. 2D) is a collection and the processing then proceeds in accordance with FIG. 5. In particular, the current path is computed during step 502. According to the configuration information associated with the example of FIG. 2D, the collection associated with root node 270-1 is an unordered data collection. Thus, in FIG. 5, program control proceeds to steps 510 and 512 to recurse for each element of the collection (e.g., administrators objects) and apply the commutative accumulator operation on the results.

As shown in box 910 in FIG. 9, the first object result for the administrator Alice object (associated with representative node 270-2 in FIG. 2D) in the collection of administrator objects 260 is 15.47385621 ((2/3)+(5/(7+11))+(13/(17/19))), as discussed further below. In addition, the second object result for administrator Bob (associated with representative node 270-6 in FIG. 2D) in the collection of administrator objects 260 is 14.57569526 ((2/23)+(5/(29+31))+(13/(37/41))), as shown in box 920. The results for administrators Alice and Bob are added to provide a result for the multi-level data structure of 30.07955147 (15.47385621+14.57569526), as shown in box 930.

FIG. 9 also shows the computation of a digest value for the exemplary administrator objects 210-2 of FIG. 2B in boxes 940, 950, 960.

When processing the administrator object Alice (associated with representative node 270-2 in FIG. 2D), it is determined that representative node 270-2 (FIG. 2D) is an administrator object 260-1 and the processing then proceeds in accordance with FIG. 6, and then in accordance with FIG. 7 for each object entry. In particular, the current path is computed during step 702 for the name object entry. The noncommutative accumulator is then initialized during step 704. The multi-level data structure comparison process 400-D then recurses for each entry key "name" in the object entry during step 706 to obtain a result of 2, and recurses for each entry value "Alice" in the object entry during step 710 to obtain a result of 3. The results are combined during step 714 using a noncommutative operation (e.g., division) to obtain a result of 0.666666667 (2/3).

The noncommutative accumulator is initialized again during step 704. The process multi-level data structure comparison 400-D recurses for each entry key "systems" in the object entry during step 706 to obtain a result of 5, and recurses for each entry value (see processing value of systems list of Alice, below) in the object entry during step 710 to obtain a result of 18. The results are combined during step 714 using a noncommutative operation (e.g., division) to obtain a result of 0.277777778 (5/18).

The noncommutative accumulator is initialized again during step 704. The multi-level data structure comparison process 400-D recurses for each entry key "objectives" in the object entry during step 706 to obtain a result of 13, and recurses for each entry value (see processing value of objectives list of Alice, below) in the object entry during step 710 to obtain a result of 0.894736842. The results are combined during step 714 using a noncommutative operation (e.g., division) to obtain a result of 14.52941176 (13/0.894736842).

The results of each object key-value entry in the Administrator object Alice are then combined during step 606 (FIG. 6) using the commutative accumulator, as follows:

$$0.666666667 + 0.277777778 + 14.52941176 = 15.47385621.$$

Thus, the result for the Alice object is 15.47385621, as noted above.

When processing the name key of Alice, a digest is computed of the value "name" to obtain a result of 2 during step 408 (FIG. 4). It is again noted that the digest values are simplified for ease of discussion. When processing the value of name of Alice, a digest is computed of the value "Alice" to obtain a result of 3 during step 408.

When processing the value of systems list of Alice, it is determined that the collection is an unordered data collection. Thus, processing continues from step 506 of FIG. 5 to recurse for each element in the systems list of Alice and apply a commutative operation on the results during steps 510 and 512. The first value of "alpha" obtains a result of 7 and the second value of "arrow" obtains a result of 11. By adding the two results (7+11) an aggregate result of 18 is obtained for the systems list of Alice, as noted above.

Likewise, when processing the value of objectives list of Alice, it is determined that the collection is an ordered data collection. Thus, processing continues from step 520 of FIG. 5 to recurse for each element in the objective list of Alice and apply a noncommutative operation on the results during steps 524 and 526. The first value of "analyzing" obtains a result of 17 and the second value of "monitoring" obtains a result of 19. By dividing the two results (17/19) an aggregate result of 0.894736842 is obtained for the objectives list of Alice, as noted above. Among other benefits, the disclosed multi-level data structure comparison techniques improve the efficiency, reliability and/or utility of the comparison.

One or more embodiments of the disclosure provide improved methods, apparatus and computer program products for comparing multi-level data structures using commutative digesting for unordered data collections. The foregoing applications and associated embodiments should be considered as illustrative only, and numerous other embodiments can be configured using the techniques disclosed herein, in a wide variety of different applications.

It should also be understood that the disclosed multi-level data structure comparison techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for comparing multi-level data structures using commutative digesting for unordered data collections may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform-as-a-Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based multi-level data structure comparison engine, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based multi-level data structure comparison platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 10 and 11. These platforms may also be used to implement at least portions of other information processing systems in other embodiments.

Figure 10:
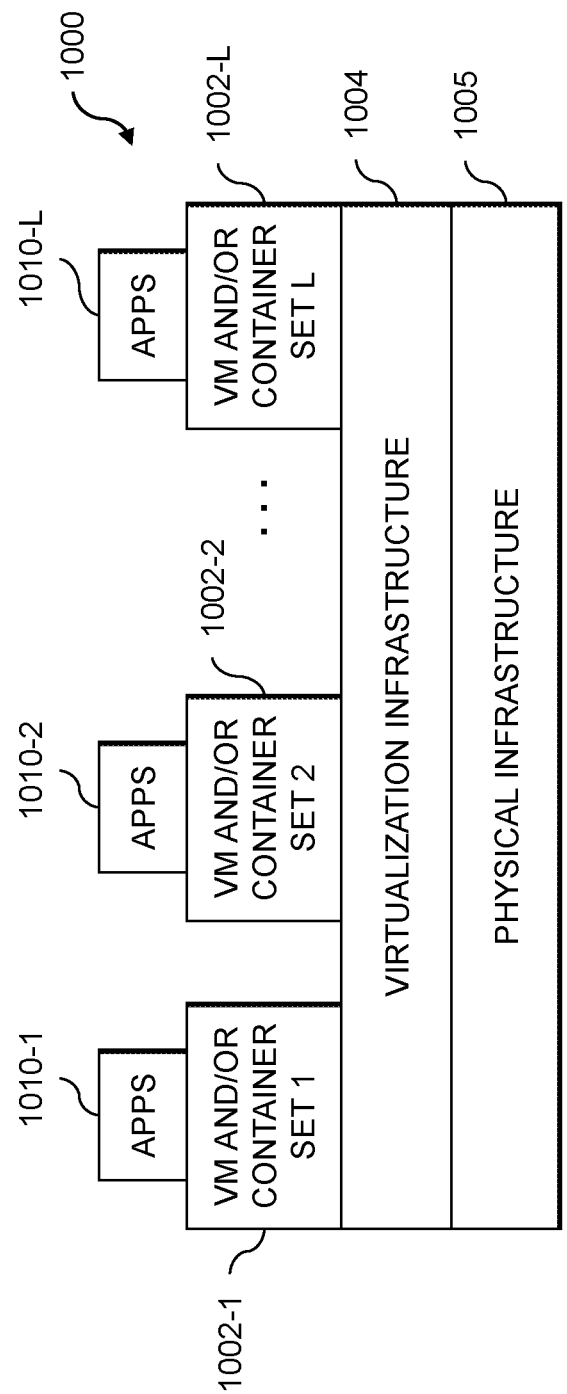
FIG. 10 illustrates an exemplary processing platform that may be used to implement at least a portion of one or more embodiments of the disclosure comprising a cloud infrastructure.

FIG. 10 shows an example processing platform comprising cloud infrastructure 1000. The cloud infrastructure 1000 comprises a combination of physical and virtual processing resources that may be utilized to implement at least a portion of the disclosed information processing systems. The cloud infrastructure 1000 comprises multiple virtual machines (VMs) and/or container sets 1002-1, 1002-2, . . . 1002-L implemented using virtualization infrastructure 1004. The virtualization infrastructure 1004 runs on physical infrastructure 1005, and illustratively comprises one or more hypervisors and/or operating system level virtualization infrastructure. The operating system level virtualization infrastructure illustratively comprises kernel control groups of a Linux operating system or other type of operating system.

The cloud infrastructure 1000 further comprises sets of applications 1010-1, 1010-2, . . . 1010-L running on respective ones of the VMs/container sets 1002-1, 1002-2, . . . 1002-L under the control of the virtualization infrastructure 1004. The VMs/container sets 1002 may comprise respective VMs, respective sets of one or more containers, or respective sets of one or more containers running in VMs.

In some implementations of the FIG. 10 embodiment, the VMs/container sets 1002 comprise respective VMs implemented using virtualization infrastructure 1004 that comprises at least one hypervisor. Such implementations can provide multi-level data structure comparison functionality of the type described above for one or more processes running on a given one of the VMs. For example, each of the VMs can implement multi-level data structure comparison control logic and associated digest values and commutative accumulation for providing multi-level data structure comparison functionality for one or more processes running on that particular VM.

An example of a hypervisor platform that may be used to implement a hypervisor within the virtualization infrastructure 1004 is the VMware® vSphere® which may have an associated virtual infrastructure management system such as the VMware® vCenter™. The underlying physical machines may comprise one or more distributed processing platforms that include one or more storage systems.

In other implementations of the FIG. 10 embodiment, the VMs/container sets 1002 comprise respective containers implemented using virtualization infrastructure 1004 that provides operating system level virtualization functionality, such as support for Docker containers running on bare metal hosts, or Docker containers running on VMs. The containers are illustratively implemented using respective kernel control groups of the operating system. Such implementations can provide multi-level data structure comparison functionality of the type described above for one or more processes running on different ones of the containers. For example, a container host device supporting multiple containers of one or more container sets can implement one or more instances of multi-level data structure comparison control logic and associated digest values and commutative accumulation for use in comparing multi-level data structures.

As is apparent from the above, one or more of the processing modules or other components of computer network 100 may each run on a computer, server, storage device or other processing platform element. A given such element may be viewed as an example of what is more generally referred to herein as a "processing device." The cloud infrastructure 1000 shown in FIG. 10 may represent at least a portion of one processing platform. Another example of such a processing platform is processing platform 1100 shown in FIG. 11.

The processing platform 1100 in this embodiment comprises at least a portion of the given system and includes a plurality of processing devices, denoted 1102-1, 1102-2, 1102-3, . . . 1102-K, which communicate with one another over a network 1104. The network 1104 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 1102-1 in the processing platform 1100 comprises a processor 1110 coupled to a memory 1112. The processor 1110 may comprise a microprocessor, a microcontroller, an application specific integrated circuit (ASIC), a field programmable gate array (FPGA) or other type of processing circuitry, as well as portions or combinations of such circuitry elements, and the memory 1112, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1102-1 is network interface circuitry 1114, which is used to interface the processing device with the network 1104 and other system components, and may comprise conventional transceivers.

The other processing devices 1102 of the processing platform 1100 are assumed to be configured in a manner similar to that shown for processing device 1102-1 in the figure.

Again, the particular processing platform 1100 shown in the figure is presented by way of example only, and the given system may include additional or alternative processing platforms, as well as numerous distinct processing platforms in any combination, with each such platform comprising one or more computers, storage devices or other processing devices.

Figure 11:
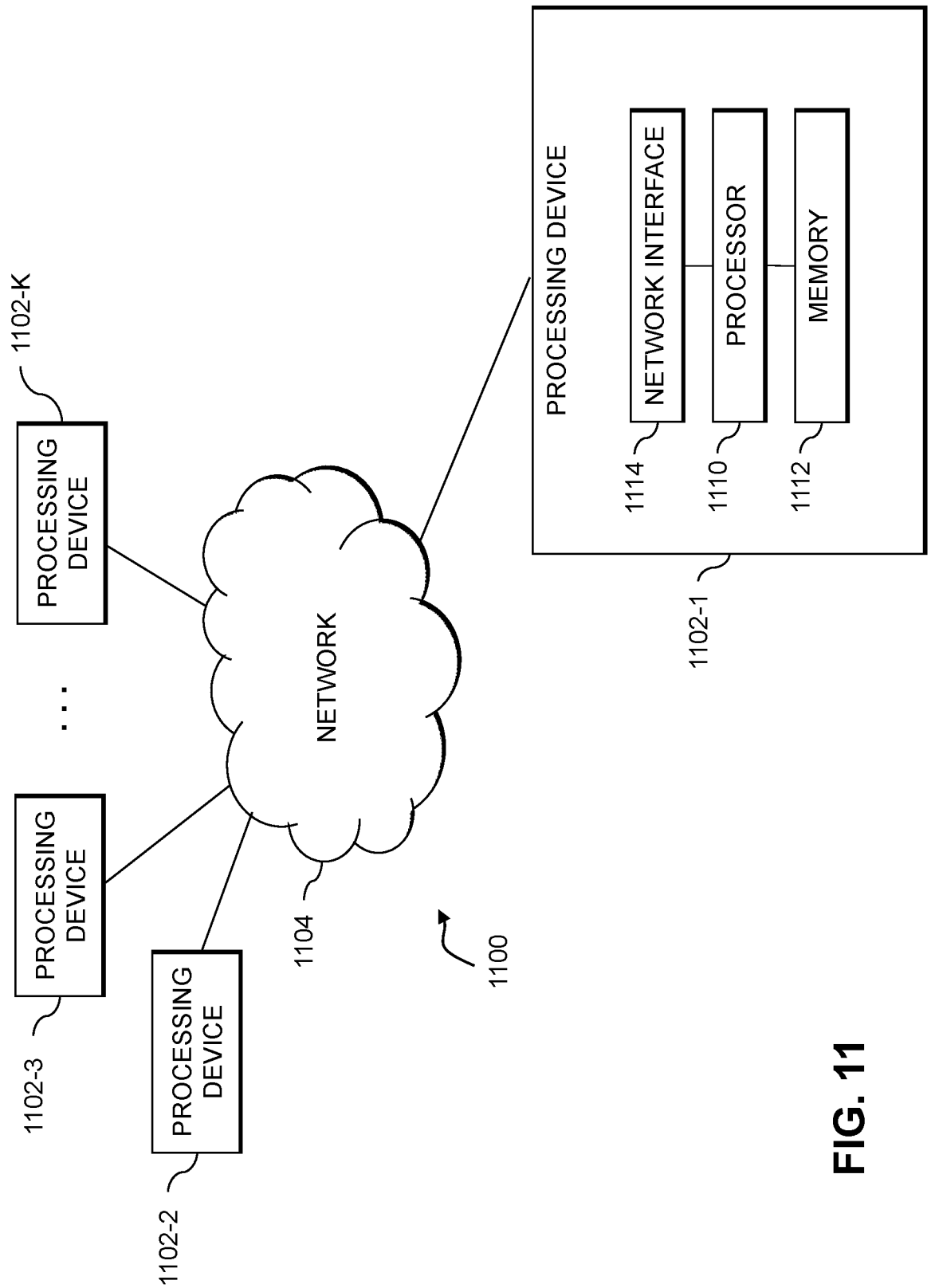
FIG. 11 illustrates another exemplary processing platform that may be used to implement at least a portion of one or more embodiments of the disclosure.

Multiple elements of an information processing system may be collectively implemented on a common processing platform of the type shown in FIG. 10 or 11, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
obtaining at least two different multi-level data structures each comprising a plurality of data elements, wherein at least one of the multi-level data structures comprises an unordered data collection, wherein an ordering of the data elements within a data collection does not have a meaning;
determining a data structure digest value for each of the at least two multi-level data structures by accumulating a data element digest value for each data element of the respective multi-level data structure, wherein a data element digest value, for a given data element comprising an unordered data collection, is determined using a commutative accumulator function, wherein the commutative accumulator function aggregates a digest value for each data element of the unordered data collection using one or more commutative operations;
evaluating a similarity of the at least two multi-level data structures by comparing the respective data structure digest values; and
automatically processing one or more of the at least two multi-level data structures using the evaluated similarity;
wherein the method is performed by at least one processing device comprising a processor coupled to a memory.

2. The method of claim 1, wherein the commutative accumulator function generates a same digest value for the unordered data collection regardless of an iteration order over the unordered data collection.

3. The method of claim 1, wherein determining the data structure digest value for a given multi-level data structure comprises recursively accumulating a data element digest value for each data element of the given multi-level data structure up to a root of the given multi-level data structure.

4. The method of claim 1, wherein a data element digest value for a given data element comprising an ordered data collection is determined using a noncommutative accumulator function.

5. The method of claim 4, wherein the noncommutative accumulator function aggregates a digest value for each data element of the ordered data collection using one or more noncommutative operations.

6. The method of claim 1, wherein two of the multi-level data structures are considered equal data structures when the respective data structure digest values of the two the multi-level data structures match one another.

7. The method of claim 1, further comprising evaluating configuration information of a given multi-level data structure to determine whether a given collection for the given multi-level data structure comprises an unordered data collection or an ordered data collection.

8. The method of claim 1, wherein the automatic processing of the one or more of the at least two multi-level data structures using the evaluated similarity of the at least two multi-level data structures comprises one or more of: (i) comparing computed data associated with a first one of the at least two multi-level data structures with expected data associated with a second one of the at least two multi-level data structures using the evaluated similarity, (ii) determining whether data of at least one of the at least two multi-level data structures has changed based at least in part on the evaluated similarity and (iii) triggering a process or application only when a data change is detected, using the evaluated similarity, in a multi-level data structure processed by the process or application.

9. The method of claim 1, wherein a digest function that determines one or more of the digest values is characterized by one or more of the following properties: the digest value for a given data element is always the same value, the digest value for the given data element is computed quickly, the digest value for the given data element changes significantly for any change to the given data element, and the digest value for the given data element has a low collision probability with respect to the digest values for other data elements.

10. An apparatus comprising:
at least one processing device comprising a processor coupled to a memory;
the at least one processing device being configured to implement the following steps:
obtaining at least two different multi-level data structures each comprising a plurality of data elements, wherein at least one of the multi-level data structures comprises an unordered data collection, wherein an ordering of the data elements within a data collection does not have a meaning;
determining a data structure digest value for each of the at least two multi-level data structures by accumulating a data element digest value for each data element of the respective multi-level data structure, wherein a data element digest value, for a given data element comprising an unordered data collection, is determined using a commutative accumulator function, wherein the commutative accumulator function aggregates a digest value for each data element of the unordered data collection using one or more commutative operations;
evaluating a similarity of the at least two multi-level data structures by comparing the respective data structure digest values; and
automatically processing one or more of the at least two multi-level data structures using the evaluated similarity.

11. The apparatus of claim 10, wherein a data element digest value for a given data element comprising an ordered data collection is determined using a noncommutative accumulator function that aggregates a digest value for each data element of the ordered data collection using one or more noncommutative operations.

12. The apparatus of claim 10, further comprising evaluating configuration information of a given multi-level data structure to determine whether a given collection for the given multi-level data structure comprises an unordered data collection or an ordered data collection.

13. The apparatus of claim 10, wherein the automatic processing of the one or more of the at least two multi-level data structures using the evaluated similarity of the at least two multi-level data structures comprises one or more of: (i) comparing computed data associated with a first one of the at least two multi-level data structures with expected data associated with a second one of the at least two multi-level data structures using the evaluated similarity, (ii) determining whether data of at least one of the at least two multi-level data structures has changed based at least in part on the evaluated similarity and (iii) triggering a process or application only when a data change is detected, using the evaluated similarity, in a multi-level data structure processed by the process or application.

14. The apparatus of claim 10, wherein the commutative accumulator function generates a same digest value for the unordered data collection regardless of an iteration order over the unordered data collection.

15. A non-transitory processor-readable storage medium having stored therein program code of one or more software programs, wherein the program code when executed by at least one processing device causes the at least one processing device to perform the following steps:
obtaining at least two different multi-level data structures each comprising a plurality of data elements, wherein at least one of the multi-level data structures comprises an unordered data collection, wherein an ordering of the data elements within a data collection does not have a meaning;
determining a data structure digest value for each of the at least two multi-level data structures by accumulating a data element digest value for each data element of the respective multi-level data structure, wherein a data element digest value, for a given data element comprising an unordered data collection, is determined using a commutative accumulator function, wherein the commutative accumulator function aggregates a digest value for each data element of the unordered data collection using one or more commutative operations;
evaluating a similarity of the at least two multi-level data structures by comparing the respective data structure digest values; and
automatically processing one or more of the at least two multi-level data structures using the evaluated similarity.

16. The non-transitory processor-readable storage medium of claim 15, wherein a data element digest value for a given data element comprising an ordered data collection is determined using a noncommutative accumulator function that aggregates a digest value for each data element of the ordered data collection using one or more noncommutative operations.

17. The non-transitory processor-readable storage medium of claim 15, further comprising evaluating configuration information of a given multi-level data structure to determine whether a given collection for the given multi-level data structure comprises an unordered data collection or an ordered data collection.

18. The non-transitory processor-readable storage medium of claim 15, wherein the automatic processing of the one or more of the at least two multi-level data structures using the evaluated similarity of the at least two multi-level data structures comprises one or more of: (i) comparing computed data associated with a first one of the at least two multi-level data structures with expected data associated with a second one of the at least two multi-level data structures using the evaluated similarity, (ii) determining whether data of at least one of the at least two multi-level data structures has changed based at least in part on the evaluated similarity and (iii) triggering a process or application only when a data change is detected, using the evaluated similarity, in a multi-level data structure processed by the process or application.

19. The non-transitory processor-readable storage medium of claim 15, wherein the commutative accumulator function generates a same digest value for the unordered data collection regardless of an iteration order over the unordered data collection.

20. The non-transitory processor-readable storage medium of claim 15, wherein determining the data structure digest value for a given multi-level data structure comprises recursively accumulating a data element digest value for each data element of the given multi-level data structure up to a root of the given multi-level data structure.

* * * * *